United States Patent
Rudy et al.

(10) Patent No.: US 6,752,373 B1
(45) Date of Patent: Jun. 22, 2004

(54) HIGH-SPEED FLUID JET BLOCKER

(75) Inventors: Norman A. Rudy, Snohomish, WA (US); Erich W. A. Wiesinger, Issaquah, WA (US)

(73) Assignee: FMC Technologies, Inc., Chicago, IL (US)

(*) Notice: Subject to any disclaimer, the term of this patent is extended or adjusted under 35 U.S.C. 154(b) by 246 days.

(21) Appl. No.: 10/025,822

(22) Filed: Dec. 18, 2001

(51) Int. Cl.⁷ .............................. B05B 1/26; F16K 31/02
(52) U.S. Cl. ................... 251/129.09; 251/300; 83/177; 239/512
(58) Field of Search ...................... 251/129.09, 129.14, 251/129.2, 299, 300, 301; 83/53.177; 239/505, 507, 509, 510, 511, 512

(56) References Cited

U.S. PATENT DOCUMENTS

| | | |
|---|---|---|
| 2,963,821 A | 12/1960 | Baker |
| 3,212,378 A | 10/1965 | Rice |
| 3,252,249 A | 5/1966 | Propst |
| 3,724,479 A | 4/1973 | Dimmick |
| 4,470,547 A * | 9/1984 | Earl ........................ 239/533.1 |
| 4,532,949 A | 8/1985 | Frank |
| 4,603,835 A * | 8/1986 | deMey, II ............... 251/300 X |
| 4,693,153 A | 9/1987 | Wainwright et al. |
| 4,920,841 A | 5/1990 | Johnson |
| 5,259,416 A * | 11/1993 | Kunz et al. ................. 137/883 |
| 5,685,482 A * | 11/1997 | Sickles .......................... 239/3 |
| 5,927,320 A * | 7/1999 | Pfarr et al. ................. 137/338 |
| 5,931,178 A * | 8/1999 | Pfarr et al. .................... 137/14 |
| 6,161,539 A * | 12/2000 | Winter ................ 251/129.2 X |
| 6,179,228 B1 * | 1/2001 | Ramaker et al. ........ 239/512 X |
| 6,565,011 B1 * | 5/2003 | Kuykendal et al. ........... 239/17 |

FOREIGN PATENT DOCUMENTS

WO    WO 93/10950    6/1993

* cited by examiner

Primary Examiner—Gene Mancene
Assistant Examiner—Eric Keasel
(74) Attorney, Agent, or Firm—Christensen O'Connor Johnson Kindness PLLC

(57) ABSTRACT

An apparatus for performing high-speed interruption of high-speed fluid jets (30) of the type used to cut food, plastics, wood, metal, and other products. The water jet (30) is interrupted by a blocking bar (22) mounted on a housing (12). The blocking bar (22) is pivoted by actuators so that the bar is disposed away from the high-speed fluid jet (30) in the open position and blockingly intersects the high-speed fluid jet (30) when in the blocking position. At least one of the actuators is an electromagnet assembly (20) and (21) having a selectively energizable coil (78) such that energizing the coil (78) will induce a magnetic field. The blocking bar (22) has an area of high magnetic permeability (114), wherein the bar (22) may be pivoted by application of the magnetic field generated by the coil (78) upon the area of high magnetic permeability (114).

35 Claims, 6 Drawing Sheets

HIGH-SPEED FLUID JET BLOCKER

FIELD OF THE INVENTION

This invention relates generally to a product cutter utilizing a high-pressure fluid jet and, more particularly, to methods and apparatus for selectively interrupting the flow of a high-pressure fluid jet in cutting and etching applications.

BACKGROUND OF THE INVENTION

High-speed fluid jets, typically but not exclusively water jets, have been used to cut food, paper, plastics, wood, and even metals and glass for years. Water and other fluid jet cutting technology provide many advantages over conventional cutting alternatives. For example, these advantages include improved safety and reduced maintenance because there are no cutting blades that need to be regularly sharpened or replaced, and reduced dust and other airborne particulate generation due to a narrow cutting stream and entrainment of particulates in the jet stream In addition, fluid jet cutting provides a quick, flexible, and clean cutting process.

In fluid jets, pressurized fluid is ejected from a small orifice to create a thin, high velocity jet of water or other fluid. When the fluid jet impinges on the target product, a thin slice of material is removed, typically without any appreciable amount of cutting fluid absorption into the product.

In many applications of water jet cutting, the desired cutting operations require precise high-speed interruption of the water jet. Generally, the greater the detail of the cutting operation, the faster the interruption of the jet must be in order to attain such detail. Also, the overall achievable speed of a cutting operation is frequently limited by the rate at which the high-speed stream can be controllably interrupted. In such applications, a higher rate of water stream interruption will reduce the overall product processing time required.

Various methods and apparatus are currently available to controllably interrupt a high-speed water jet. One such method of interruption is to use a linear actuator to insert an object between the high-speed water jet and the product. Typically, a pneumatic linear actuator forces a blocker pin into the path of the water jet to interrupt the flow of the cutting stream and a spring provides a retracting force for the blocker pin. Existing pneumatic blocker pin devices achieve closure times of 50–90 ms, and thereby limit the speed at which products may be cut by the water jet.

U.S. Pat. No. 4,693,153, issued to Wainwright et al., discloses another water jet interruption technique. When interruption of the high-speed water jet is desired, a second high-pressure fluid is directed at the object cutting jet so as to disperse the latter and impair its cutting properties. The device that controls the second fluid flow is similar to the plunger pin device. A solenoid device within the jet obstructer device controls the fluid flow from the jet obstructer device. An energized solenoid closes a plunger mechanism that is normally held in an open position by a spring. In the open position, the mechanism provides high-pressure fluid to interrupt the object-cutting water jet. Similar to the plunger pin device, this device also lacks the high-speed interruption capabilities necessary for cutting products as rapidly as may be desired.

International Patent Application No. WO 93/10950 discloses a valve for controlling a constantly running liquid cutting jet. A pneumatically-powered rotary cylinder 2 is attached to one end of and elongate plate 1 to rotate the opposite end of the plate in and out of the path of flow of the liquid cutting jet. However, the opening and closing times for this rotary plate are only slightly better than that of existing plunger pin devices. Also, the cutting jet only strikes one position on the plate requiring frequent replacement of the plate.

Pivoting pin interruption mechanisms are taught in U.S. Pat. No. 5,931,178 and No. 5,927,320, both issued to Pfarr et al. and owned by the assignee of the present application. The Pfarr et al. patents both disclose a water jet blocking device that utilizes a blocking pin having a first end attached to a rotary actuator and a second end disposed near a high-speed fluid jet. An actuator pivots the blocking pin about a center fulcrum, such that the second end of the blocking pin can be selectively swung to block the high-speed jet stream. The pivoting pin interruption mechanism overcomes many of the disadvantages of the prior art, while permitting faster activation times and a durable apparatus. However, further improvements in activation time and durability remain desirable. Accordingly, certain embodiments of the present invention provide advantages over previous devices or methods of controllably blocking high-speed fluid jets.

SUMMARY OF THE INVENTION

In accordance with the present invention, a high-speed fluid jet blocker for selectively blocking a high-speed fluid jet is provided. The jet blocker includes at least one electromagnet assembly having a selectively energizable coil such that energizing the coil will induce a magnetic field. The jet blocker further includes a blocking bar having an area of high magnetic permeability, the bar being pivotable to at least either an open position or a blocking position by application of the magnetic field generated by the coil upon the area of high magnetic permeability. When the blocking bar is in the open position, the blocking bar is disposed away from the high-speed fluid jet. When the blocking bar is in the blocking position, the blocking bar blockingly intersects the high-speed fluid jet.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE ILLUSTRATED EMBODIMENT

Figure 1:
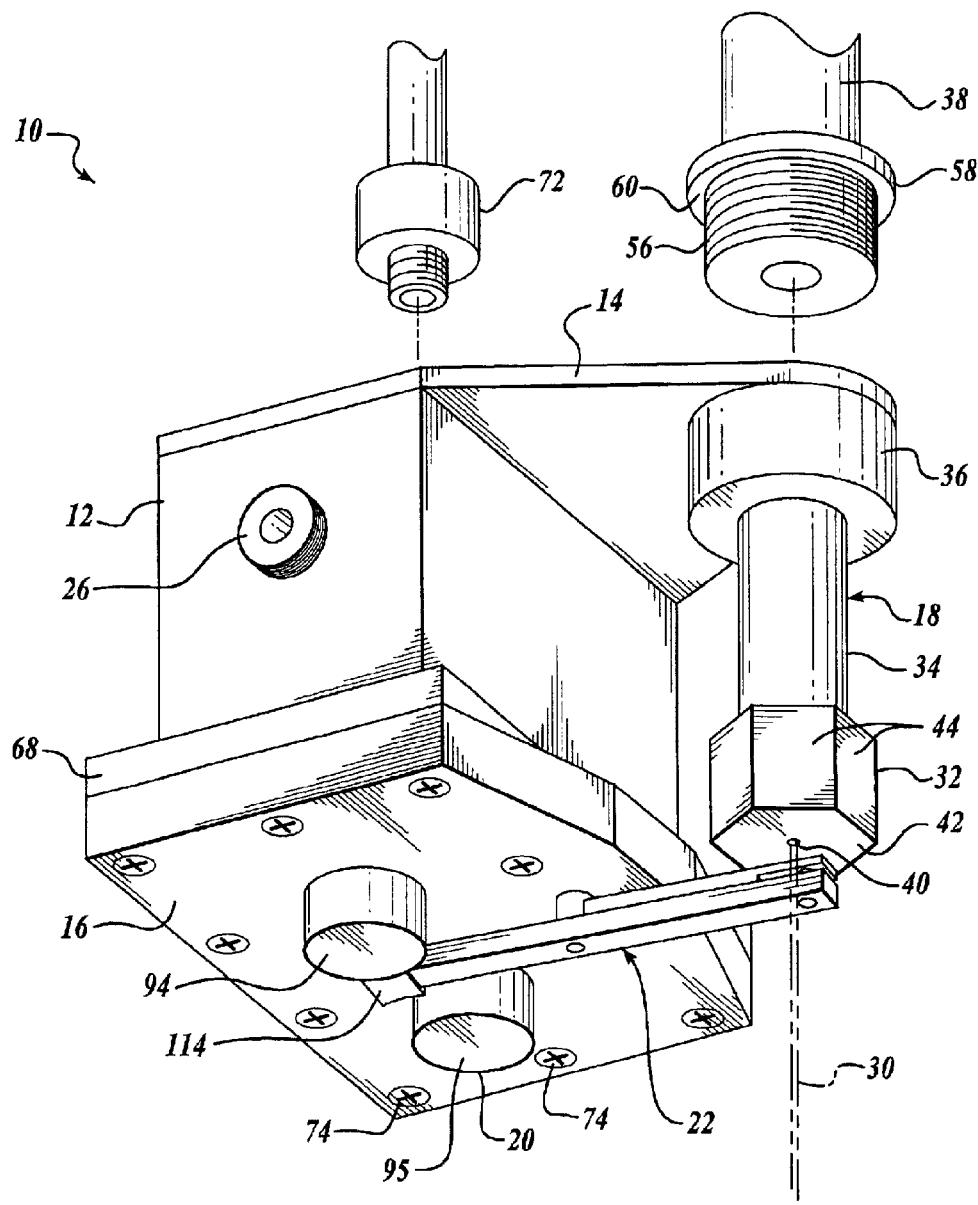
FIG. 1 is an isometric view of a jet blocker formed in accordance with one embodiment of the present invention.

A high-speed water jet blocker 10 ("jet blocker") formed in accordance with one embodiment of the present invention, is illustrated in FIGS. 1–5. The jet blocker 10 includes a main housing 12, a top mounting plate 14, a bottom cover plate 16, a water jet assembly 18, a blocking bar assembly 22, an electrical connector 24, and cooling air inlet and outlet ports 26 and 28. Although the embodiment of the jet blocker is illustrated and described as a high-speed water jet, it should be apparent that other types of jet blockers, such as those utilizing other fluids, solids, such as sand or other particulate matter, or a combination of both, as the cutting material are also within the scope of the present invention.

For the purposes of this detailed description, the jet blocker 10 shown in FIG. 1 is oriented so that the water jet 30 is discharged vertically downward from the water jet assembly 18. The horizontal planar surface of the jet blocker 10, from which the high speed water jet 30 discharges perpendicularly from, will hereafter be referred to as the bottom, and the opposing parallel horizontal surface of the jet blocker 10 as the top. Although descriptive terminology such as top and bottom will be used in the description of the illustrated embodiment, it should be readily apparent that the jet blocker may be disposed in any orientation advantageous to the user of the jet blocker. Accordingly, such descriptive language is illustrative in nature and not limiting.

Figure 4:
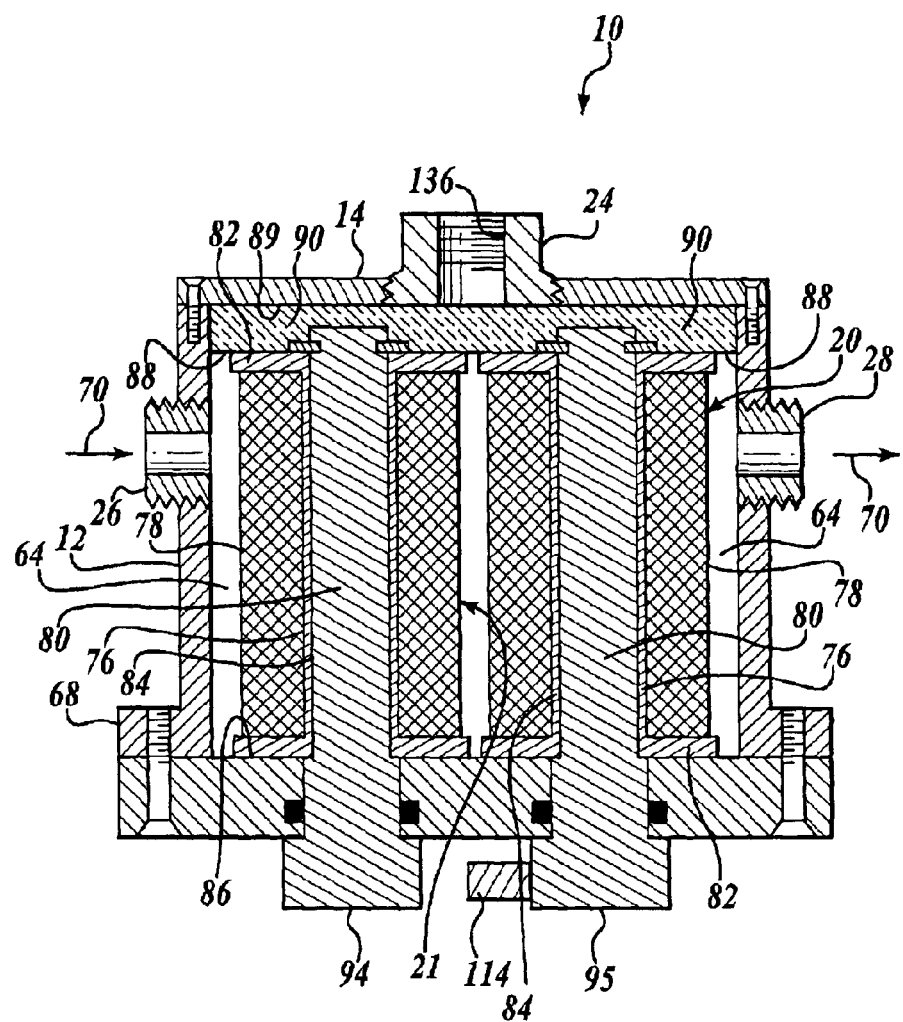
FIG. 4 is a cross-sectional view taken through the electromagnet assemblies of the embodiment of the present invention shown in FIG. 3, taken substantially through SECTION 4—4.
Figure 5:
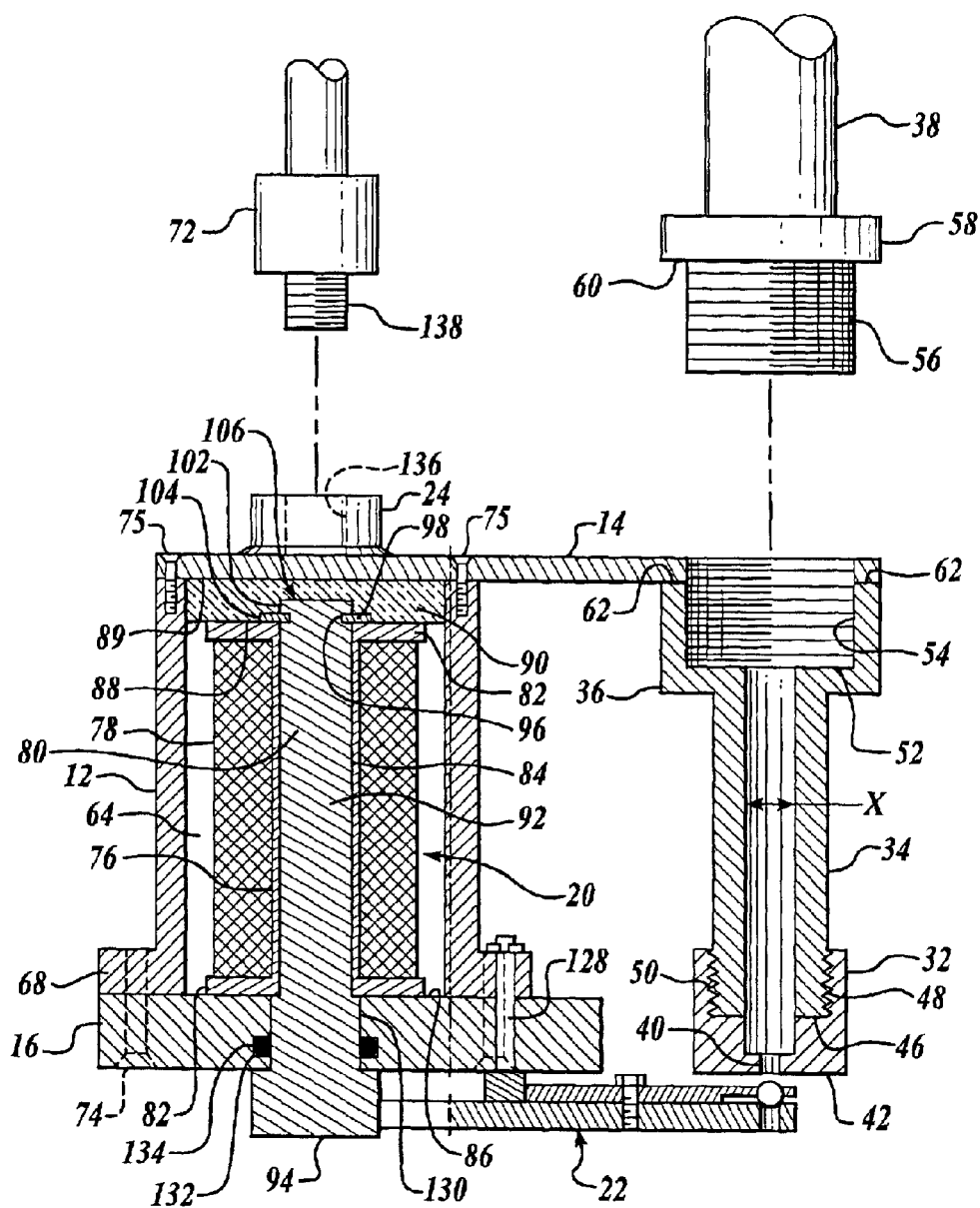
FIG. 5 is a cross-sectional view of the jet blocker illustrated in FIG. 3, taken substantially through SECTION 5—5, and showing a cross-section of an electromagnet assembly formed in accordance with one embodiment of the present invention.

Referring primarily to FIGS. 1, 4, and 5, the main housing 12 may be a generally rectangular-shaped sleeve defining an interior cavity 64 sized to house two electromagnet assemblies 20 and 21. The main housing 12 also includes inlet and outlet air cooling ports 26 and 28, respectively, and a bottom-mating flange 68. The main housing 12 is preferably constructed of a rust-resistant material, such as stainless steel, composite material, or polymer, due to its use in proximity to water; however, any suitable material may be utilized in its construction as is apparent to one skilled in the art.

Referring to FIGS. 1 and 5, the water jet assembly 18 is comprised of a nozzle 32, nozzle cylinder 34, nozzle cylinder base 36, and a high-pressure water line 38. The nozzle 32 is comprised of a bottom surface 42, a nozzle orifice 40, hexagonal sides 44, and a cavity 46. The cavity 46 has female threads 48 cut into its inner bore to accept the male threads 50 of the nozzle cylinder 34. The hexagonal sides 44 of the nozzle 32 are dimensioned and oriented to accept a standard sized wrench to accommodate the convenient removal and installation of the nozzle 32. Although the nozzle 32 in the illustrated embodiment is attached to the nozzle cylinder 34 by a threaded coupling, it is readily apparent to one skilled in the art that the nozzle 32 may be affixed in one of many alternate ways, or may be integral with the nozzle cylinder 34 without departing from the scope of this invention.

The nozzle cylinder 34 is an elongated cylinder capable of withstanding high fluid pressures, having male threads 50 on its bottom distal end to accept the nozzle 32 therein, and upon the opposing (top) end, a nozzle cylinder base 36. The nozzle cylinder base 36 is integral with the nozzle cylinder 34 in the illustrated embodiment. The nozzle cylinder base 36 has a cavity 52, disposed with female threads 54 and dimensioned to accept the high-pressure water line 38. The inner passage diameters of both the nozzle 32 and the nozzle cylinder 34 may be dimensioned to coincide with that of the inner diameter of the high-pressure water line 38 to provide smooth water flow transitions between the sections. The nozzle cylinder base 36 of the illustrated embodiment is shown as integral with the nozzle cylinder 34 and having a smooth cylindrical outer surface. However, the nozzle cylinder base 36 member may also be formed as a separate part, with a hexagonal outer surface to accept a standard sized wrench to aid in the removal and installation of the high-pressure water line 38 and nozzle 32, or formed in other shapes as is apparent to one skilled in the art.

The high-pressure water line 38 is made of a suitable material to withstand the high-pressure fluid carried within. The proximal end of the high-pressure water line 38 is disposed with male threads 56 dimensioned to coincide with the female threads 54 of the nozzle cylinder base 36. The proximal end of the high-pressure water line 38 is also formed with a mating flange 58. The mating flange 58 protrudes radially outward around the circumference of the high pressure water line 38, and is located adjacent to the last (topmost) male thread of the distal end of the high pressure water line 38. The bottom mating surface 60 of the mating flange 58 and the top mating surface 62 of the nozzle cylinder base 36 clamp against the top mounting plate 14 when the threads 56 of the high pressure water line 38 fully engage the threads 54 of the nozzle cylinder base 36, removably fastening the water jet assembly 18 to the top mounting plate 14.

Referring to FIGS. 1, 4, and 5, the top mounting plate 14 is detachably fastened to the main housing 12 with a plurality of screws 75.

As best seen in FIG. 4, the inlet and outlet air cooling ports 26 and 28 are located on opposing sides of the main housing 12 and consist of threaded couplings, as is well know in the art. Convective cooling air 70 is directed through the inlet port 26 and into the cavity 64 of the main housing 12. Once in the cavity 64, the cooling air 70 flows around the two electromagnet assemblies and 21 located within the main housing 12. The cooling air 70 helps remove the heat generated by the operation of the electromagnet assemblies 20 and 21, thereby assisting in maintaining the temperature of the electromagnet assemblies 20 and 21 within optimum operating parameters. Once the cooling air 70 has passed around the electromagnet assemblies and 21, the cooling air 70 is discharged from the cavity 64 through the outlet port 28. Although air is used as the cooling medium in the illustrated embodiment, it should be apparent to one skilled in the art that air is only one of many suitable fluids capable of serving as the cooling medium.

Referring to FIG. 1, the mating flange 68 is located along and integral with the bottom edge of the main housing 12. The mating flange 68 provides a flat mating surface for the detachable mounting of the bottom cover plate 16 to the main housing 12 with a plurality of screws 74.

Referring to FIGS. 4 and 5, the main housing 12 is fitted with a threaded electrical connector 24. The electrical connector 24 contains inner female threads 136 dimensioned to correspond with the male threads 138 of a power cord connector 72. Both the power cord connector 72 and the main housing electrical connector 24 are fitted with electrical contacts (not shown). When the connectors 24 and 72 are fully engaged with another, the contacts of each connector 24 and 72 are also engaged with the corresponding contacts of the opposing connector. Electrical current and other signals required for the operation of the electromagnet assemblies 20 and 21 pass through the contacts to enter the main housing 12, as required for selectively energizing and controlling the electromagnet assemblies 20 and 21.

The disclosed embodiment depicts threaded connections to the cooling air inlet and outlet ports 26 and 28, electrical connectors 24 and 72, and between the nozzle 32, nozzle cylinder 34, and nozzle cylinder base 36. However, it will be readily apparent to one skilled in the art that any conventional type of coupling mechanism could be provided at these connection points without departing from the scope of the present invention.

Still referring to FIGS. 4 and 5, housed within the main housing 12 are electromagnet assemblies 20 and 21. The electromagnet assemblies 20 and 21 are each individually comprised of a spool 76, surrounded by a coil 78, and a core 80. The spools 76 may be cylindrical in shape, with the exception of integral end flanges 82 disposed on each distal end. Wire is wrapped tightly around the cylindrical body of the spool 76 between the integral end flanges 82, creating the coils 78. In the illustrated embodiment, the spools 76 are constructed from non-ferromagnetic materials, such as polycarbonate materials, to reduce interference with the magnetic fields produced by the electromagnet assemblies 20 and 21. The inner cylindrically shaped cavities 84 of the spools are diametrically dimensioned to snugly accept the electromagnet cores 80. The overall length of the spools 76 is selected so that the spools 76 may be press fit (clamped) between the inner surface 86 of the bottom cover plate 16 and the bottom surface 88 of an insulation block 90, sandwiched between the top of the spool and the underside of the top mounting plate when the water jet blocker 10 is fully assembled.

Disposed within the inner cylindrically shaped cavities 84 of the spools 76 are the electromagnet cores 80. Each individual electromagnet core 80 is comprised of a central shaft 92, exposed core end 94 or 95, E-clip circumferential groove 96, and E-clip 98. The central shaft 92 is diametrically dimensioned to closely coincide with the inner diameter of the spools 76. During installation, the central shafts 92 of the cores 80 are pressed through the electromagnet apertures 1 in the bottom cover plate 16 and into the inner cylindrically shaped cavities 84 of the spools 76. Once the E-clip circumferential grooves 96 appear beyond the top end flanges 82 of the spools 76, E-clips 98 are pressed into the circumferential grooves 96, detachably coupling the cores 80 within the spools 76.

The insulation block 90 may be generally rectangular in shape with outer length and width dimensions coinciding with the inner dimensions of the main housing 12. The thickness of the insulation block 90 is selected to provide a compression fit of the insulation block 90 in combination with the spools 76, between the upper surface 86 of the bottom cover plate 16 and the bottom surface 89 of the top mounting plate 14 when the water jet blocker 10 is fully assembled. The insulation block 90 is also comprised of two sets of stepped bores 106, one set aligned with each electromagnet assembly 20 and 21. The stepped bores 106 are oriented and dimensioned to accept the distal ends of the central shafts 92 of the electromagnet assemblies 20 and 21. More specifically, the longer and more narrow portion 102 of the stepped bores 106 is dimensioned to accept the central shafts 92 of the cores 80; and the second, concentrically located and larger diameter shoulder portion 104 of the stepped bores 106 is dimensioned to accept the central shafts' 92 E-clips 98. The insulation block 90 is further comprised of passages (not shown for clarity) to allow the routing of the electrical wires contained in the power cord connector 72 to the electromagnet assemblies 20 and 21. In the illustrated embodiment, the insulation block 90 is constructed from non-ferromagnetic materials, such as polycarbonate materials, to reduce interference with the magnetic fields produced by the electromagnet assemblies 20 and 21.

The central shafts 92 of the cores 80 extend through the bottom cover plate 16 creating exposed ends 94 and 95. The exposed ends 94 and 95 are comprised of concentrically-oriented knobs created by a step up in diameter of the central shafts 92.

The cores 80 are formed from ferromagnetic materials having high magnetic permeability and serve to form a path to contain and guide the magnetic flux created when current is applied to the coils 78. Depending upon the direction of current flow applied to the coils 78, the exposed ends 94 and 95 are either a north or south magnetic pole. Reversing the polarity of the current applied to a coil 78 will result in a corresponding reversal of the polarity of the exposed ends 94 and 95 of the magnetic cores 80.

Figure 6:
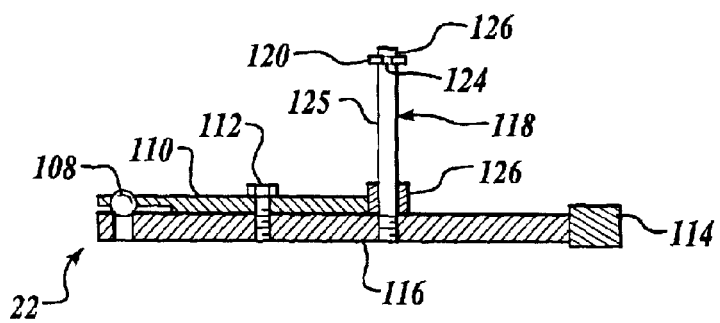
FIG. 6 is a cross-sectional view of a blocking bar formed in accordance with one embodiment of the present invention and suitably used with the jet blocker illustrated in FIG. 1.
Figure 7:
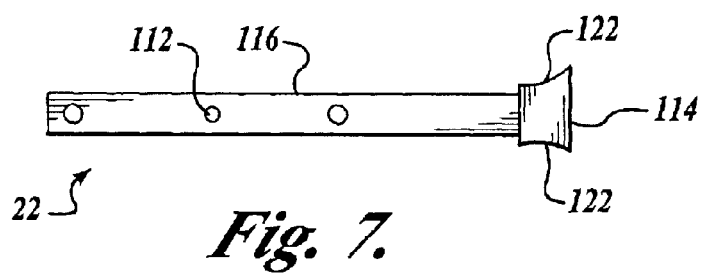
FIG. 7 is a bottom view of the blocking bar of FIG. 6.
Figure 8:
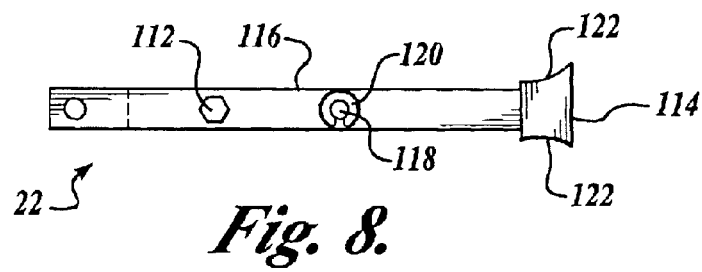
FIG. 8 is a top plan view of the blocking bar of FIG. 6.

Detachably and rotatably mounted to the bottom cover 16 is a blocking bar assembly 22. More specifically, referring to FIGS. 6–8, the blocking bar assembly 22 is comprised of blocking ball 108, ball mounting plate 110, mounting plate screw 112, hammer 114, blocking bar arm 116, pivot shaft 118, and pivot shaft E-clip 120. The blocking ball 108 is formed from a material of sufficient hardness to resist rapid erosion under direct impact of the water jet 30. In the illustrated embodiment illustrated, materials of sapphire or carbide are utilized, however any number of suitable materials may be selected without departing from the scope of this invention as would be apparent to one skilled in the art.

Mounting of the blocking ball 108 on the blocking bar assembly 22 is accomplished by press fitting (clamping) the blocking ball 108 between the mounting plate 110 and the blocking bar arm 116, with the clamping force applied by the mounting plate screw 112. Both the blocking bar arm 116 and the mounting plate have recesses dimensionally shaped to accept the blocking ball 108. In the illustrated embodiment, the blocking ball 108 is not restrained and has rotational freedom. During impingement of the water jet 30 upon the blocking ball 108, rotational forces are exerted upon the blocking ball 108, causing the blocking ball 108 to rotate. This rotation has the advantageous effect of varying the point of impact of the water jet 30 on the blocking ball. This promotes even wear upon the entire surface of the blocking ball 108, thereby increasing the longevity of the blocking ball 108 relative to a fixed blocking element.

Figure 9:
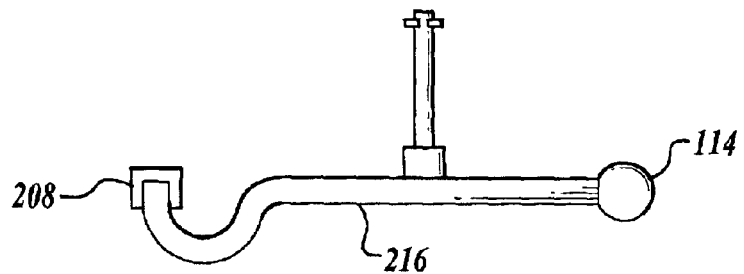
FIG. 9 is a side planar view of an alternate embodiment of the blocking bar of FIG. 6.

Referring now to FIG. 9, an alternate embodiment of the present invention's blocking bar assembly 22 is shown. In this embodiment, the toggle blocking bar assembly 22 is comprised of a fixed (non-rotatable) cubic blocking element 208 attached to the distal end of a blocking bar arm 216. Although two methods of providing a blocking element upon the block bar arm 116 20 and 216 are illustrated herein, it should be apparent to one skilled in the art that other means of providing a blocking surface upon the blocking bar assembly 22 are available and within the scope of this invention.

Referring to FIGS. 1 and 6–8, attached (or integral) to the end of the blocking bar arm 116 is a hammer 114. The hammer 114 is generally rectangular in shape, with the exception of sides 122, which curve inward towards the center of the hammer. The curvature of sides 122 is selected to coincide with the curvature of the outer cylindrical shape of the exposed ends 94 and 95 of the electromagnet assemblies 20 and 21, respectively. The location of the hammer 114 along the blocking bar arm 116, and curvature of the sides 122 of the hammer 114, are selected so that when the blocking bar arm 116 is rotated about the pivot shaft 118, the curved sides 122 of the hammer 114 closely mate with the outer cylindrically curved surfaces of the exposed ends 94 and 95 with maximum contact surface area. The hammer 114 is preferably constructed of ferromagnetic materials having high magnetic permeability that react strongly when subjected to an applied magnetic field, thereby creating an area of high magnetic permeability on the blocking bar 22.

The pivot shaft 118 is comprised of shank 125 extending transversely from an intermediate location of the arm 116, and an annular groove 124. Attached to the pivot shaft 118 are an E-clip 1and a spacer 126. The annular groove 124 is circumferentially oriented at the distal end of the pivot shaft 118 and is dimensioned to accept a standard E-clip 120. The spacer 126 is a hollow cylinder, with the inner diameter dimensioned to correspond with the outer diameter of the shank 125. The length of the spacer 126 is selected so that when the blocking bar assembly 22 is mounted on the bottom cover plate 16, the blocking bar assembly 22 may freely rotate about the pivot shaft 118 without interference between the bottom cover plate 16 and the hammer 114, or between the blocking ball 108 and the nozzle 32. Although in the illustrated embodiment, the spacer 126 is in the form of a hollow cylinder slipped onto the shank 125, it may also be formed as an integral portion of the pivot shaft 118 as is apparent to one skilled in the art.

Referring to FIG. 5, the shank 125 is oriented perpendicular to the length of the blocking bar assembly 22 and is of sufficient length so that it may pass through the thickness of the bottom cover plate 16 and the main housing mating flange 68 and expose the annular groove 124 on the distal end of the pivot shaft 118. An E-clip 1may then be inserted upon the annular groove 124, thus removably and rotatably attaching the blocking bar 22 to the bottom cover plate 16.

Referring to FIG. 5, machined in the bottom cover plate 16 are holes to accept mounting screws 74, a pivot shaft aperture 128, two electromagnet apertures 130, and two annular O-ring grooves 132 sized to receive two O-rings 134. The pivot shaft aperture 128 is a perpendicular oriented bore through the bottom cover plate 16 dimensioned to accept the shank 1of the pivot shaft 118. Although not illustrated for clarity, the aperture 128 may be constructed with a bearing to facilitate the rotation of the shank 125 within the aperture 128, as is well known in the art. The two electromagnet apertures 130 are perpendicularly-oriented bores through the bottom cover plate 16, dimensioned to accept the central shafts 92 of the electromagnet assemblies 20 and 21. The electromagnet apertures 130 are constructed with annular O-ring grooves 132 to accept O-rings 134 therein. The O-rings 134 serve to resist the entrance of fluids into the main housing 12 along the central shafts 92 of the electromagnet assemblies 20 and 21. A plurality of mounting screws 74 removably mount the bottom cover 16 to the main housing mating flange 68. In the illustrated embodiment, the bottom cover plate 16 is constructed from non-ferromagnetic materials, such as polycarbonate materials, to help reduce interference with the magnetic fields produced by the electromagnet assemblies 20 and 21.

In light of the description of the various components of the water jet blocker 10 as found above, the operation of the jet blocker will now be discussed. Referring to FIG. 1, high-pressure fluid provided from the high-pressure water line 38 is directed through the nozzle cylinder 34 and into the cavity of the nozzle 32. Once in the nozzle 32, the fluid is forced through the nozzle orifice 40, thereby creating a very fine, high-pressure, high-speed water jet emanating from the nozzle orifice 40. Upon discharging from the nozzle orifice 40, the jet 30 is preferably directed to impinge upon the product (not shown). Preferably, the jet 10 blocker is mounted in a robotic device (not shown) so that the point of impingement of the water jet 30 upon the product may be adjusted allowing the user to cut or etch intricate patterns upon the product quickly and accurately. Alternately, the product or both the product and the jet blocker 10 may be moved to achieve a similar result, as is apparent to one skilled in the art.

Figure 2:
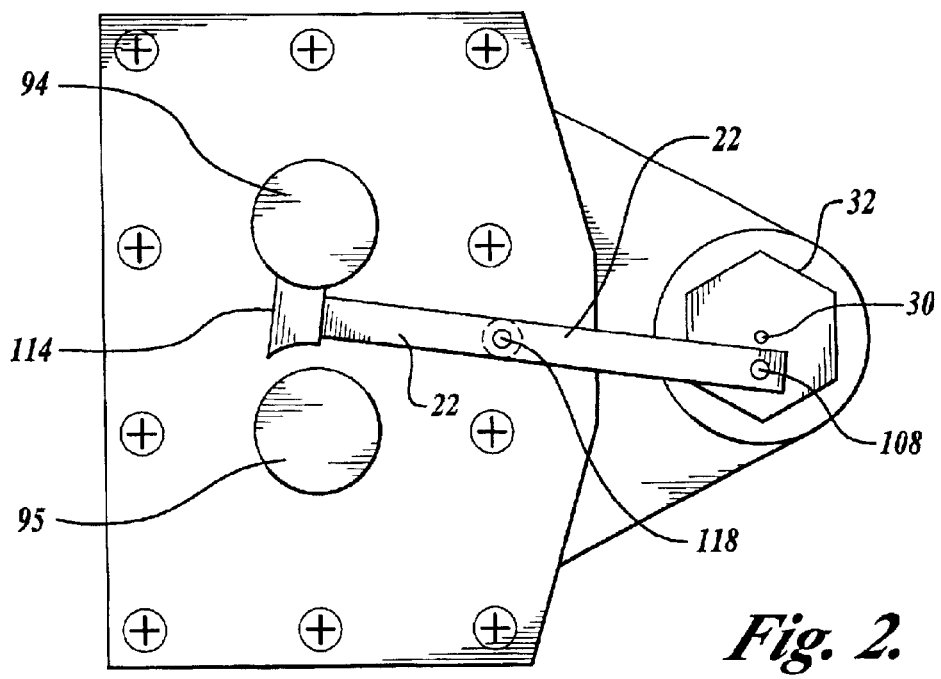
FIG. 2 is a bottom planar view of the jet blocker shown in FIG. 1 with a blocking bar illustrated in an open position.

As discussed in the background section above, it is desirable to selectively block the water jet 30 during processing quickly and precisely. To accomplish the blocking of the water jet 30, two toggle actuators are used to selectively pivot the blocking bar 22 between an open position and a blocking position. In the illustrated embodiment, the toggle actuators may be in the form of two electromagnets 20 and 21 that are selectively energized to rotate blocking ball 108 of blocking bar 22 directly into the path of the water jet (blocking position), disrupting the jet 30 and preventing its contact with the product (not shown). In FIG. 2, the blocking bar assembly 22 is shown in the open position, so that no portion of the blocking bar assembly 22 obstructs the jet 30 emanating from the nozzle 32 and the jet 30 is free to strike the product (open position).

Figure 3:
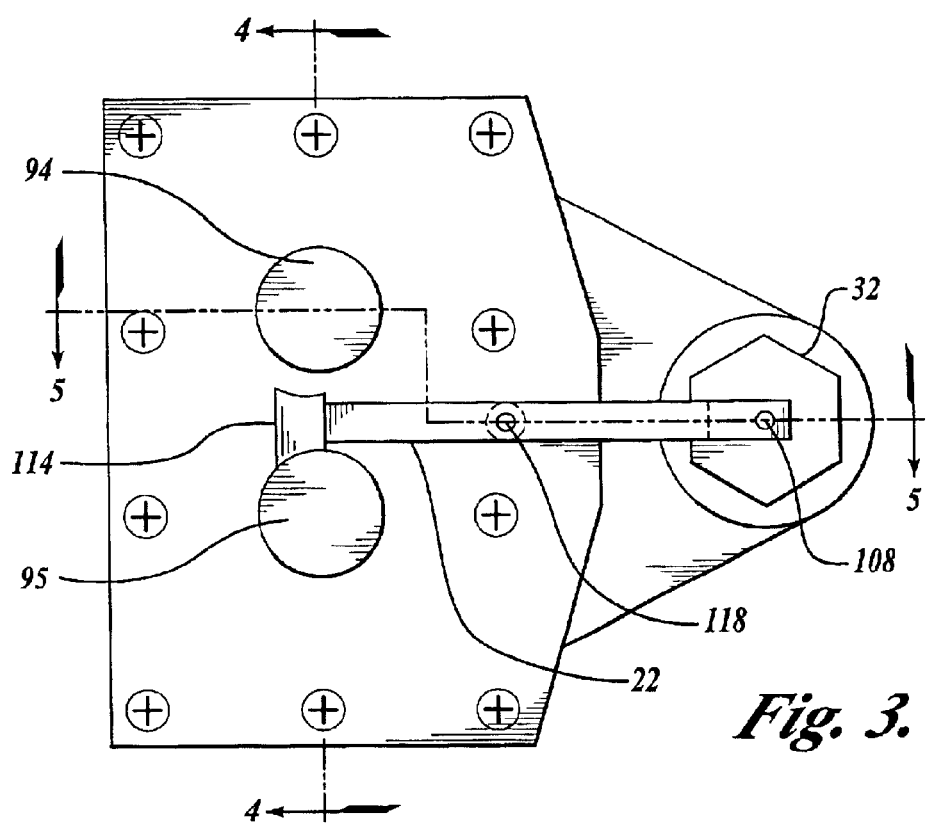
FIG. 3 is a bottom planar view of the jet blocker shown in FIG. 1 with the blocking bar in a blocking position.

To toggle the blocking bar assembly 2 into the blocked position, as shown in FIG. 3, from the open position, shown in FIG. 2, the user reverses the polarity of the current supplied to each of the coils of the electromagnet assemblies. This causes exposed core end 94 to be developed as a north pole node and the other exposed core end 95 to be developed as a south pole node. With the coils 78 energized as described, the hammer 114 of the blocking bar assembly 22 is repelled by the magnetic field emanating from exposed end 94 and attracted by the magnetic field associated with exposed end 95. Thus, a magnetically-induced counterclockwise movement is applied to the blocking bar assembly 22, causing it to rotate about its pivot shaft 118, aligning the blocking ball 108 directly in the path of the water jet at the moment the hammer 114 strikes exposed end 95, as best shown in FIG. 3. With the blocking bar 22 aligned as described, the water jet 30 is thus prevented from impinging upon the product (not shown), as the water jet 30 is now completely blocked by blocking ball 108. The water diverted from the water jet 30 by the presence of the blocking ball 108 is then collected by means (not shown) well known in the art for reuse or disposal.

When the user desires the water jet 30 to once again impinge upon the product (not shown), the polarity of the current applied to the coils 78 is reversed, causing the hammer to be repelled from exposed end 95 and attracted to exposed end 94, rotating the blocking bar assembly 22 clockwise, thereby removing all portions of the blocking bar assembly 22 from the path of the water jet 30. Preferably the polarity of the current applied to the coils 78 is controlled by a computer system (not shown), allowing quick and precise control of water jet 30 interruption.

From the above description, it should be apparent to one skilled in the art that the exposed ends 94 and 95 also serve as limit stops, defining the rotational limits of the blocking bar 22 during operation. It should be also apparent that although the illustrated embodiment utilizes the exposed ends 94 and 95 as limit stops, other means for providing limit stops other than the exposed ends 94 and 95 are readily apparent to one skilled in the art and within the scope of this invention. For example, pins located on each side of the blocking bar that limit the rotational freedom of the blocking bar would suitably serve as limit stops.

It should also be apparent to one skilled in the art that multiple alternate methods of interrupting a high-speed water jet by selectively energizing the magnetic assemblies 20 and 21 of the illustrated embodiment exist and are within the scope of this invention. In one such alternate method, in lieu of simultaneously reversing the polarity of the electromagnetic assemblies 20 and 21 to provide simultaneously an attracting and a repelling force upon the hammer 114 as described above, the user may apply current exclusively to a first electromagnet assembly while de-energizing the second electromagnet. For example, referring now to FIG. 1, by selecting the correct polarity of the current applied to the coils 78, exposed ends 94 and 95 may both be arranged as north pole nodes, thereby capable of providing repelling forces to the hammer 114. By selectively energizing the coil 78 associated with exposed end 94, and de-energizing the coil 78 associated with exposed end 95, the hammer 114 will be repelled from the energized exposed end 94, rotating the blocking bar assembly 22 until the hammer 114 contacts the second de-energized exposed end 95. Arranged as described, the blocking ball 108 will be directly in the path of the water jet 30, as shown in FIG. 3. To rotate the blocking bar assembly 22 back to the open position, the magnetic assembly 20 associated with the energized exposed end 94 is de-energized, and the previously de-energized exposed end 95 energized, returning the blocking bar assembly 22 to the position shown in FIG. 2. It should be apparent to one skilled in the art that this same method of selectably energizing the coils would work equally well with an opposing polarity current applied to the coils 78, so that the exposed ends 94 and 95 become south pole nodes, providing attracting instead of repelling forces to the hammer 114.

In yet another alternate method of selectively blocking a high speed water jet 30, a single electromagnet assembly is utilized to rotate blocking bar assembly 22. In this embodiment, the polarity of the current applied to a single coil 78 is selectively reversed to apply alternately an attractive force then a repelling force upon the hammer 114, thereby selectively rotating the blocking bar assembly 22 between the open and blocked positions. For example, referring to FIG. 2, the polarity of the current applied to electromagnet assembly 20 is selected to produce a north pole node in exposed end 94, thereby repelling hammer 114 away from said node and towards de-energized exposed end 95, placing the blocking ball 108 directly in the path of the water jet 30, thereby preventing its impingement upon the product (not shown) as shown in FIG. 3. To resume the impingement of the water jet 30 upon the product, the current applied to the electromagnet assembly 20 associated with exposed end 94 is reversed, creating a south pole node at the exposed end 94, thereby exhibiting an attractive force upon the hammer 114, drawing the hammer 114 towards exposed end 94. The blocking bar 22 is therefore forced to rotate clockwise, removing the blocking ball 108 from the water jet 30 path, placing the blocking bar 22 in the position depicted in FIG. 2. In this arrangement, only one electromagnet assembly 20 is required. However, the exposed end 95 of the electromagnet or an equivalent structure is still necessary to provide a limit stop for the blocking bar assembly 22 to maintain the blocking bar assembly 22 in correct alignment when repelled from exposed end 94.

Figure 10:
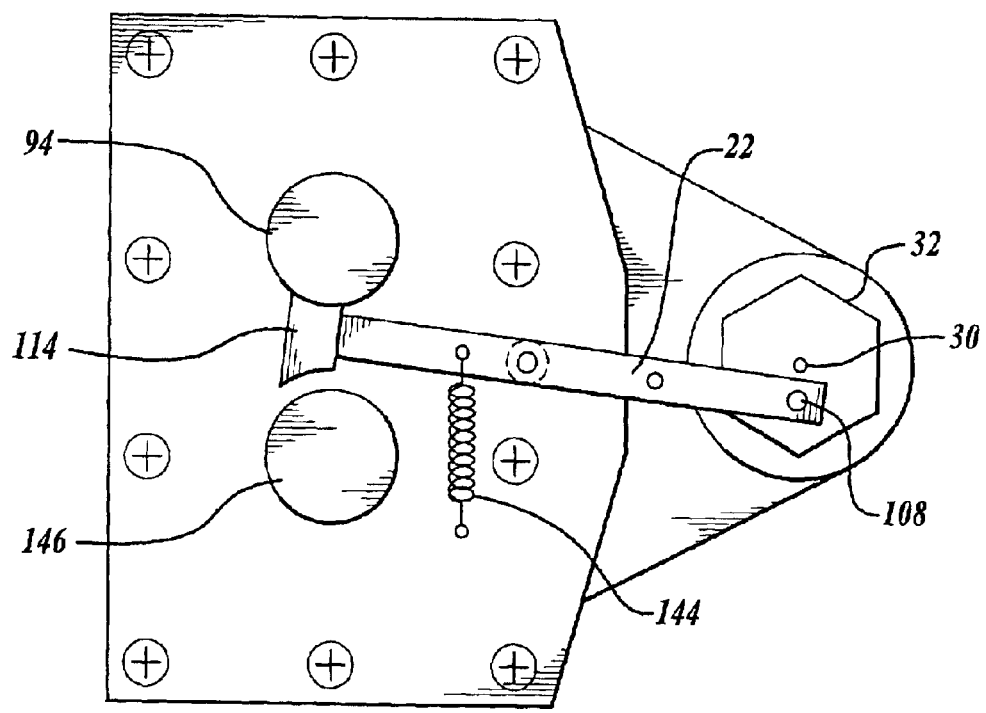
FIG. 10 is a bottom view of an alternate embodiment of the jet blocker illustrated in FIG. 1 and showing a blocking bar biasing element.

In still yet another method for selectively blocking a high speed water jet, a toggle actuator comprising a electromagnet assembly is utilized to rotate blocking bar assembly 22 in combination with a second toggle actuator comprising a biasing element 144, such as a spring, as shown in FIG. 10. In this embodiment of the invention, the polarity of the current applied to the coil associated with the exposed end 94 is selected to provide an attractive force upon the hammer 114, tending to draw the hammer 114 towards the exposed end 94 of the electromagnet assembly. In opposition to this attractive force, a biasing element 144 is attached to the blocking bar assembly 22 tending to bias the hammer 114 away from the exposed end 94 of the electromagnet assembly and towards a mechanical stop 146. The force exerted by the biasing element 144 is selected to be less than the strength of the attractive force applied by the magnetic field created by the magnetic assembly upon the hammer 114 when the coil is energized. Therefore, when the coil is energized, the force applied by the biasing element 144 is overcome, causing the blocking bar assembly 22 to rotate clockwise from the blocked position to the open position, resulting in the arrangement shown in FIG. 10. When the coil is de-energized, the attractive force applied by the exposed end 94 of the energized coil upon the hammer 114 no longer exists; therefore, the ever-present force applied by the biasing element 144 upon the blocking bar assembly 22 rotates the blocking bar assembly 22 counterclockwise back into the blocked position with the hammer 114 resting against the mechanical stop 146. Although one method of mechanically biasing the blocking bar assembly 22 is shown, other methods of biasing the blocking bar assembly 22 are readily apparent to one skilled in the art and are within the scope of this invention.

While the illustrated embodiment of the invention has been illustrated and described, it will be appreciated that various changes can be made therein without departing from the spirit and scope of the invention.

The embodiments of the invention in which an exclusive property or privilege is claimed are defined as follows:

1. A high-speed fluid jet blocker for selectively blocking a high-speed fluid jet comprising:
   a first electromagnet assembly having a selectively energizable coil, such that energizing the coil will induce a magnetic field;
   a blocking bar having a blocking element and an area of high magnetic permeability, the blocking bar being pivotable to at least either an open position or a blocking position by application of the magnetic field generated by the coil upon the area of high magnetic permeability; and
   wherein the blocking bar is disposed away from the high-speed fluid jet when the blocking bar is in the open position and wherein the blocking element blockingly intersects the high-speed fluid jet when the blocking bar is in the blocking position, and wherein the blocking element is substantially spherical in shape and rotatable mounted on the blocking bar, wherein impingement of the fluid jet upon the surface of the blocking element imparts a rotational movement to the blocking element.

2. The high-speed fluid jet blocker of claim 1, further comprising a biasing element, positioned to bias the blocking bar to either the open position or the blocking position, wherein the selective de-energizing of the first electromagnet assembly will allow the biasing element to pivot the blocking bar to either the open position or the blocking position.

3. The high-speed fluid jet blocker of claim 1, wherein a current applied to the first electromagnet assembly is selectively reversible in polarity to impart a corresponding reverse in polarity of the magnetic field.

4. The high-speed fluid jet blocker of claim 1, wherein the first electromagnet assembly is selectively energizable between a first polarity and a second polarity, wherein when the first electromagnet assembly is selectively energized to the first polarity, the blocking bar is pivoted to the open position, and when the first electromagnet assembly is selectively energized to the second polarity, the blocking bar is pivoted to the closed position.

5. The high-speed fluid jet blocker of claim 1, further comprising a housing containing the first electromagnet assembly, wherein the housing is fitted with a cooling fluid inlet and a cooling fluid outlet, wherein a cooling fluid may be introduced into the housing through the cooling fluid inlet, and exit through the cooling fluid outlet, to cool the first electromagnet assembly contained within the housing.

6. The high-speed fluid jet blocker of claim 1, wherein the blocking bar is pivoted between a first and a second limit stop, so that when the blocking bar is against the first limit stop, the blocking bar is in the open position and when against the second limit stop, the blocking bar is in the blocking position.

7. The high-speed fluid jet blocker of claim 6, wherein:
the first or the second limit stop is comprised of the first electromagnet assembly; and
wherein a portion of the electromagnet assembly extends into the rotational path of the blocking bar, blocking the further rotation of the blocking bar.

8. The high-speed fluid jet blocker of claim 1, wherein the blocking bar is comprised of a first end having the area of high magnetic permeability and a second end having the blocking element, wherein the second end of the blocking bar is disposed away from the high-speed fluid jet when the blocking bar is in the open position and wherein the blocking element of the second end intersects the high-speed fluid jet when the blocking bar is in the blocking position.

9. The high-speed fluid jet blocker of claim 8, further comprising a second electromagnet assembly having a selectively energizable coil such that energizing the coil will induce a magnetic field, wherein, when the blocking bar is pivoted to the open position, the first end is pivoted toward the first electromagnet assembly, and when pivoted to the blocking position, the first end is pivoted toward the second electromagnet assembly, by application of the magnetic fields generated by the coils upon the area of high magnetic permeability of the blocking bar.

10. The high-speed fluid jet blocker of claim 8, wherein the blocking element is comprised of sapphire.

11. The high-speed fluid jet blocker of claim 8, wherein the blocking element is comprised of carbide.

12. The high-speed fluid jet blocker of claim 8, wherein the blocking bar is further comprised of a support pivot, wherein the support pivot is disposed between the first end and the second end of the blocking bar.

13. The high-speed fluid jet blocker of claim 1, wherein the blocking bar is comprised of a first end having the area of high magnetic permeability and a second end having a blocking element, wherein the second end of the blocking bar is disposed away from the high-speed fluid jet when the blocking bar is in the open position and wherein the blocking element of the second end intersects the high-speed fluid jet when the blocking bar is in the blocking position.

14. The high-speed fluid jet blocker of claim 13, wherein the blocking element is spherical in shape and rotatably mounted on the second end of the blocking bar, wherein impingement of the high-speed fluid jet upon the surface of the ball imparts rotational movement to the blocking element.

15. The high-speed fluid jet blocker of claim 13, wherein the blocking bar is further comprised of a support pivot, wherein the support pivot is disposed between the first end and the second end of the blocking bar.

16. The high-speed fluid jet blocker of claim 13, further comprising a second electromagnet assembly having a selectively energizable coil such that energizing the coil will induce a magnetic field, wherein, when the blocking bar is pivoted to the open position, the first end is pivoted toward the first electromagnet assembly, and when pivoted to the blocking position, the first end is pivoted toward the second electromagnet assembly by application of the magnetic fields generated by the coils upon the area of high magnetic permeability of the blocking bar.

17. The high-speed fluid jet blocker of claim 13, wherein the blocking element is comprised of sapphire.

18. The high-speed fluid jet blocker of claim 13, wherein the blocking element is comprised of carbide.

19. A high-speed fluid jet blocker for selectively blocking a high-speed fluid jet comprising:
a blocking bar having a substantially spherical blocking element and an area of high magnetic permeability, the blocking bar being pivotable to either an open position or a blocking position by application of a magnetic field upon the area of high magnetic permeability;
wherein the blocking bar is disposed away from the high-speed fluid jet when the blocking bar is in the open position and positioned such that the substantially spherical blocking element blockingly intersects the high-speed fluid jet when the blocking bar is in the blocking position, wherein impingement of the high-speed fluid jet upon the substantially spherical blocking element imparts rotational movement to the substantially spherical blocking element; and
at least a first actuator capable of pivoting the blocking bar to the open position or the blocking position by selectively generating the magnetic field.

20. The high-speed fluid jet blocker of claim 19, further comprising a second actuator capable of pivoting the blocking bar by selectively generating the magnetic field.

21. The high-speed fluid jet blocker of claim 19, wherein the substantially spherical blocking element is comprised of sapphire.

22. The high-speed fluid jet blocker of claim 19, wherein the substantially spherical blocking element is comprised of carbide.

23. The high-speed fluid jet blocker of claim 19, wherein the blocking bar further comprises a support pivot, wherein the support pivot is disposed between the area of high magnetic permeability and the substantially spherical blocking element.

24. The high-speed fluid jet blocker of claim 19, wherein the blocking bar is pivoted between the open position and the blocking position by selectively reversing the polarity of a current used in generating the magnetic field by the first actuator.

25. The high-speed fluid jet blocker of claim 19, further comprising a housing containing the first actuator, wherein the housing is fitted with a cooling fluid inlet and a cooling fluid outlet, wherein a cooling fluid may be introduced into the housing through the cooling fluid inlet to cool the actuator and exit the housing by the cooling fluid outlet.

26. The high-speed fluid jet blocker of claim 19, further comprising a second actuator, wherein the actuator is a biasing element capable of pivoting the blocking bar.

27. The high-speed fluid jet blocker of claim 26, wherein the biasing element is arranged to bias the blocking bar to either the open position or the blocking position, wherein the selective generating of the magnetic field by the first actuator will allow the biasing element to pivot the blocking bar to either the open position or the blocking position.

28. A high-speed fluid jet blocker for selectively blocking a high-speed fluid jet comprising;

a housing;

a blocking bar comprising a first portion comprised of materials having a high magnetic permeability;

a mounting assembly for pivotally mounting the blocking bar to the housing;

a first electromagnet assembly for pivoting the blocking bar between an open position and a blocking position, wherein a second portion of the blocking bar blockingly intersects the high speed fluid jet when the blocking bar is in the blocking position and when in the open position, the blocking bar is oriented so that the blocking bar is out of the path of the high-speed fluid jet; and wherein the first electromagnet assembly is comprised of a selectively-energizable electromagnet coil capable of inducing a magnetic field of sufficient strength to interact with the materials of high magnetic permeability of the first portion of the blocking bar, thereby pivoting the blocking bar to at least either the open position or the blocking position, wherein the blocking bar is pivoted between a first and a second limit stop, so that when the blocking bar is against the first limit stop, the blocking bar is in the open position and when against the second limit stop, the blocking bar is in the blocking position, and wherein the first or the second limit stop is comprised of a portion of the first electromagnet assembly extending into the rotational path of the blocking bar thereby blocking further rotation of the blocking bar.

29. The high-speed fluid jet blocker of claim 28, further comprising a biasing element that biases the blocking bar to either the open position or the blocking position.

30. A high-speed fluid jet blocker for selectively blocking a high-speed fluid jet comprising:

a first and a second electromagnet assembly each having a selectively-energizable coil such that energizing the coil will induce a magnetic field;

a blocking bar comprised of a first end having an area of high magnetic permeability and a second end having a blocking element, wherein the blocking bar is pivotable between an open position, wherein the first end is pivoted towards the first electromagnet assembly, and a blocking position, wherein the first end is pivoted towards the second electromagnet assembly, by application of the magnetic fields generated by the coils upon the area of high magnetic permeability of the blocking bar; and wherein the second end of the blocking bar is disposed away from the high-speed fluid jet when the blocking bar is in the open position and wherein the blocking element of the second end intersects the high-speed fluid jet when the blocking bar is in the blocking position, wherein the blocking element is substantially spherical in shape and rotatable mounted on the blocking bar, wherein impingement of the high-speed fluid jet upon the surface of the blocking element imparts rotational movement to the blocking element.

31. A high-speed fluid jet blocker for selectively blocking a high-speed fluid jet comprising:

a first electromagnet assembly having a selectively energizable coil, such that energizing the coil will induce a magnetic field;

a blocking bar having an area of high magnetic permeability, the blocking bar being pivotable to at least either an open position or a blocking position by application of the magnetic field generated by the coil upon the area of high magnetic permeability; and wherein the blocking bar is disposed away from the high-speed fluid jet when the blocking bar is in the open position and blockingly intersects the high-speed fluid jet when the blocking bar is in the blocking position, wherein the blocking bar is pivoted between a first and a second limit stop, so that when the blocking bar is against the first limit stop, the blocking bar is in the open position and when against the second limit stop, the blocking bar is in the blocking position, wherein the first or the second limit stop is comprised of a portion of the first electromagnet assembly extending into the rotational path of the blocking bar thereby blocking the further rotation of the blocking bar.

32. The high-speed fluid jet blocker of claim 31, further comprising a housing containing the first electromagnet assembly, wherein the housing is fitted with a cooling fluid inlet and a cooling fluid outlet, wherein a cooling fluid may be introduced into the housing through the cooling fluid inlet, and exit through the cooling fluid outlet, to cool the first electromagnet assembly contained within the housing.

33. The high-speed fluid jet blocker of claim 31, wherein the first electromagnet assembly is selectively energizable between a first polarity and a second polarity, wherein when the first electromagnet assembly is selectively energized to the first polarity, the blocking bar is pivoted to the open position, and when the first electromagnet assembly is selectively energized to the second polarity, the blocking bar is pivoted to the closed position.

34. The high-speed fluid jet blocker of claim 31, further comprising a biasing element, positioned to bias the blocking bar to either the open position or the blocking position, wherein the selective de-energizing of the first electromagnet assembly will allow the biasing element to pivot the blocking bar to either the open position or the blocking position.

35. The high-speed fluid jet blocker of claim 31, wherein a current applied to the first electromagnet assembly is selectively reversible in polarity to impart a corresponding reverse in polarity of the magnetic field.

* * * * *

UNITED STATES PATENT AND TRADEMARK OFFICE
CERTIFICATE OF CORRECTION

PATENT NO. : 6,752,373 B1
DATED : June 22, 2004
INVENTOR(S) : N.A. Rudy et al.

It is certified that error appears in the above-identified patent and that said Letters Patent is hereby corrected as shown below:

Column 1,
Line 66, "WO 93/10950" should read -- WO 93/10950 --

Column 4,
Line 51, "assemblies and 21," should read -- assemblies 20 and 21, --

Column 5,
Line 46, "1in" should read -- 130 in --

Column 6,
Line 43, "mounting plate have recesses" should read -- mounting plate 110 have recesses --
Line 60, "arm 116 20 and" should read -- arm 116 and --

Column 7,
Line 19, "1and" should read -- 120 and --
Line 39, "1may" should read -- 120 may --
Line 48, "1of" should read -- 125 of --

Column 10,
Line 55, "rotatable" should read -- rotatably --

Column 14,
Line 3, "rotatable" should read -- rotatably --

Signed and Sealed this

Twenty-first Day of December, 2004

JON W. DUDAS
*Director of the United States Patent and Trademark Office*